United States Patent
Johnson et al.

(10) Patent No.: US 9,063,956 B2
(45) Date of Patent: *Jun. 23, 2015

(54) ASSISTED PHOTO-TAGGING WITH FACIAL RECOGNITION MODELS

(71) Applicant: Shutterfly, Inc., Redwood City, CA (US)

(72) Inventors: Andrea R. Johnson, Palo Alto, CA (US); Matthew J. Johnson, Palo Alto, CA (US); Nico Toutenhoofd, Boulder, CO (US); Clinton L. Fenton, Steamboat Springs, CO (US)

(73) Assignee: Shutterfly, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,585

(22) Filed: Sep. 5, 2014

(65) Prior Publication Data

US 2014/0376786 A1     Dec. 25, 2014

Related U.S. Application Data

(63) Continuation of application No. 13/535,037, filed on Jun. 15, 2012, now Pat. No. 8,861,804.

(51) Int. Cl.
*G06K 9/00* (2006.01)
*G06K 9/68* (2006.01)
*G06F 17/30* (2006.01)

(52) U.S. Cl.
CPC ........ *G06F 17/3028* (2013.01); *G06K 9/00221* (2013.01); *G06F 17/30247* (2013.01); *G06F 17/30268* (2013.01); *G06K 9/00261* (2013.01); *G06K 9/00268* (2013.01); *G06K 9/00288* (2013.01); *G06K 2009/00328* (2013.01)

(58) Field of Classification Search
None
See application file for complete search history.

(56) References Cited

U.S. PATENT DOCUMENTS

| 8,503,739 | B2 | 8/2013 | Bourdev |
| 2011/0038512 | A1 | 2/2011 | Petrou |
| 2011/0211736 | A1 | 9/2011 | Krupka |
| 2011/0317928 | A1 | 12/2011 | Yabu et al. |
| 2012/0076367 | A1 | 3/2012 | Tseng |

*Primary Examiner* — Daniel Mariam
(74) *Attorney, Agent, or Firm* — Xin Wen

(57) ABSTRACT

Embodiments of the invention perform assisted tagging of images, including tagging of people, locations, and activities depicted in those images. A batch of images is received comprising images of faces, including at least some faces that have not yet been tagged. A facial recognition algorithm is applied to the faces to determine matching data comprising possible tags for each untagged face. A logic engine applies logic rules to reduce the likelihood that certain matches are correct. The most likely match from among the possible matches is selected for suggestion to the user for verification. Once verified, the metadata of the image indicating the recognized people within the image is updated.

20 Claims, 8 Drawing Sheets

ASSISTED PHOTO-TAGGING WITH FACIAL RECOGNITION MODELS

CROSS REFERENCE TO RELATED APPLICATIONS

This application is related to U.S. patent application Ser. No. 13/525,134, filed Jun. 15, 2012, titled "Image Sharing with Facial Recognition Models," and U.S. patent application Ser. No. 13/525,076, filed Jun. 15, 2012, titled "Fast Display of Time Line Layout of Images," both of which are hereby incorporated by reference in their entirety.

BACKGROUND

1. Technical Field

This invention pertains in general to online storage and management for multimedia and in particular to methods of tagging photos and videos.

2. Description of Related Art

Digital cameras have become a widespread tool for capturing photographs and videos. It is common for a typical user to own and use multiple digital cameras, such as a camera integrated into a mobile phone, a webcam attached to a home computer, a point-and-shoot camera, and a digital single-lens reflex (DSLR) camera. It is also common for multiple users attending the same event to take photos and videos of the event from different angles and at different times. As a result, related photos and videos are saved to storage devices on many different cameras, mobile phones, and computers, and it is difficult and inconvenient for users to organize these photos and videos and share them with each other.

Some users might organize and share their photos and videos by uploading them to an online multimedia hosting service, such as FLICKR®, PHOTOBUCKET®, VIMEO®, or YOUTUBE®. Many users register for these hosting services because they wish to make their own photos and videos available to their friends and family and to view related photos and videos that were taken by others. However, content sharing methods on current hosting services are completely manual. Thus, if a user wishes to view photos and videos that were taken by other users at the event, the user must actively search for the other users and browse through their photo and video libraries to find the desired content. This makes it difficult for users to discover relevant photos and videos taken by others and efficiently share their own photos and videos with their friends and family.

Existing online multimedia hosting services provide means for a user to tag people in photographs. In general, this requires the user to manually review every photograph, identify one or more people in the photograph, and add one or more tags to identify the people in the photograph. This can be a time consuming and tedious process even for relatively small collections of photographs. Various algorithms and services exist for identifying people in images based on facial recognition, such as the services available from FACE-.COM®. However, use of facial recognition algorithms for photo tagging has been limited due to the lack of reliability of existing algorithms to accurately and consistently identify people. One notable limitation of existing algorithms is a lack of reliability in correctly distinguishing between close relatives, such as siblings. This raises particular concerns for image tagging applications, because parents, for example, may have hundreds or thousands of pictures of each of their children, who may closely resemble each other and who parents want to tag in their image collections.

SUMMARY

Embodiments of the invention include a method, a non-transitory computer readable storage medium and a system for assisted tagging of images, including tagging of people, locations, and activities depicted in those images. In one embodiment, a batch of images is received comprising images of faces, including at least some faces that have not yet been tagged. A facial recognition algorithm is applied to the faces to determine matching data comprising possible tags for each untagged face. In some cases the matching data includes a measure of likelihood that a match is correct. A logic engine applies logic rules to reduce the likelihood that certain matches are correct, for example based on the fact that a person cannot be in two places at the same time, that two different faces in the same image cannot correspond to the same person, and/or based on knowledge of the likely gender or age of the person in the image compared to the gender or age of the possible match at the time the image was captured. The most likely match from among the possible matches is selected for suggestion to the user for verification. Once verified, the metadata of the image indicating the recognized people within the image is updated.

In another embodiment, assisted tagging of locations is performed on a batch of images by comparing location metadata for each of the images to a database of known locations. Images with location metadata indicating a location within a geographic area of a known location are tagged as corresponding to that known location. Images that do not correspond to a known location a grouped by location, such that the locations of the images within the group are within a threshold distance of each other. The user is requested to provide a name for the location of the group and to indicate any images in the group that do not correspond to the named location. Once verified, the location metadata for the images can be updated accordingly.

In another embodiment, assisted tagging of activities is performed on a batch of images by comparing timestamp metadata for each of the images to a database of known activities having names and time ranges. Images with timestamps corresponding to the time ranges of known activities are tagged as corresponding to those activities. Images that do not correspond to a known activity are grouped by time and optionally also by location. The user is requested to provide a name for the activity of the group and to indicate any images in the group that do not correspond to the named activity. In one implementation, alternatively or additionally, activities can be suggested to a user that has occurred at the location of the image on or around the time of year that the image was taken. Once verified, the activity metadata for the images can be updated accordingly.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention provide assisted tagging of images, including tagging of people, locations, and activities depicted in those images. The accurate tagging of people, locations, and activities for even large sets of images can be more conveniently accomplished using the assisted tagging techniques described herein. As a result, the collection of images become searchable, displayable, and shareable using the people, location, and activity tags that have been created.

System Overview

Figure 1:
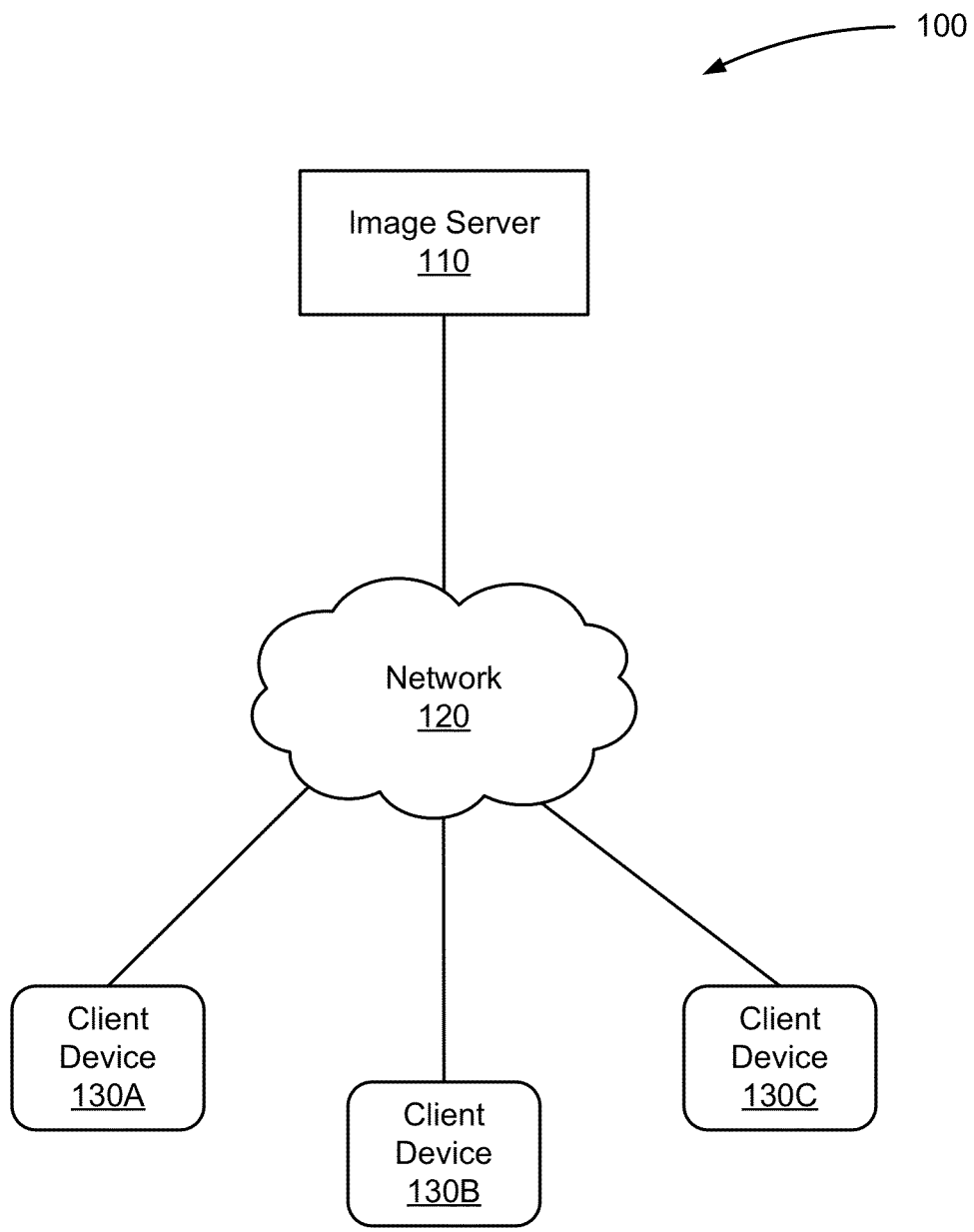
FIG. 1 is a network diagram of a system environment for an image server, in accordance with one embodiment.

FIG. 1 is a network diagram of a system environment 100 for an image server, in accordance with an embodiment of the invention. The system environment 100 includes an image server 110, a network 120, and client devices 130. Although only three client devices 130A, 130B, 130C are shown in FIG. 1 in order to clarify and simplify the description, a typical embodiment of the system environment 100 may include thousands or millions of client devices 130 connected to image server 110 via network 120. Similarly, although the image server 110 is shown as a single entity, the functionality described herein may be distributed across multiple machines.

The image server 110 receives images from the client devices 130 and performs a wide variety of tasks related to storing and sharing the images. After a user contributes images to the image server 110, the contributing user can interact with the image server 110 to share the images with other users, organize the images into memory boxes, identify and tag people in the images, and perform many other tasks. In addition, the image server 110 can analyze the metadata of contributed images to find related images and perform facial recognition to automatically identify and tag recognized people in images. A detailed description of the image server 110 is provided below with reference to FIG. 2.

The network 120 relays communications between the image server 110 and the client devices 130. In one embodiment, the network 120 uses standard Internet communications technologies and/or protocols. Thus, the network 120 can include link technologies such as Ethernet, IEEE 802.11, IEEE 806.16, WiMAX, 3GPP LTE, integrated services digital network (ISDN), asynchronous transfer mode (ATM), and the like. Similarly, the networking protocols used on the network 120 can include the transmission control protocol/Internet protocol (TCP/IP), the hypertext transport protocol (HTTP), the simple mail transfer protocol (STMP), the file transfer protocol (FTP), and the like. The data exchanged over the network 120 can be represented using technologies and/or formats including the hypertext markup language (HTML), the extensible markup language (XML), etc. In addition, all or some links can be encrypted using conventional encryption technologies such as the secure sockets layer (SSL), Secure HTTP (HTTPS) and/or virtual private networks (VPNs). In another embodiment, the entities can use custom and/or dedicated data communications technologies instead of, or in addition to, the ones described above.

The client devices 130 are electronic devices that are capable of communicating with the image server 110 via the network 120. For example, a client device 130 may be a smartphone, a personal digital assistant (PDA), a tablet computer, a laptop computer, a desktop computer, or the like. A client device 130 may optionally include an integrated camera so that the device can be used to upload an image to the image server 110 after capturing the image. Alternatively, a user transfers images to the client device 130 (e.g., via data cable transfer from a digital camera or by scanning printed photographs) and then the images are uploaded to the image server 110 from the client device 130 via the network 120.

A single user may use multiple client devices 130 to interact with the image server 110 using the same user account. For example, a user can use a first client device 130A (e.g., a smartphone) to capture an image, and upload the image to the image server 110 using his or her user account. Later, the same user can use a second client device 130B (e.g., a desktop computer) to access the same user account and share the uploaded image with a different user of the image server 110.

Figure 2:
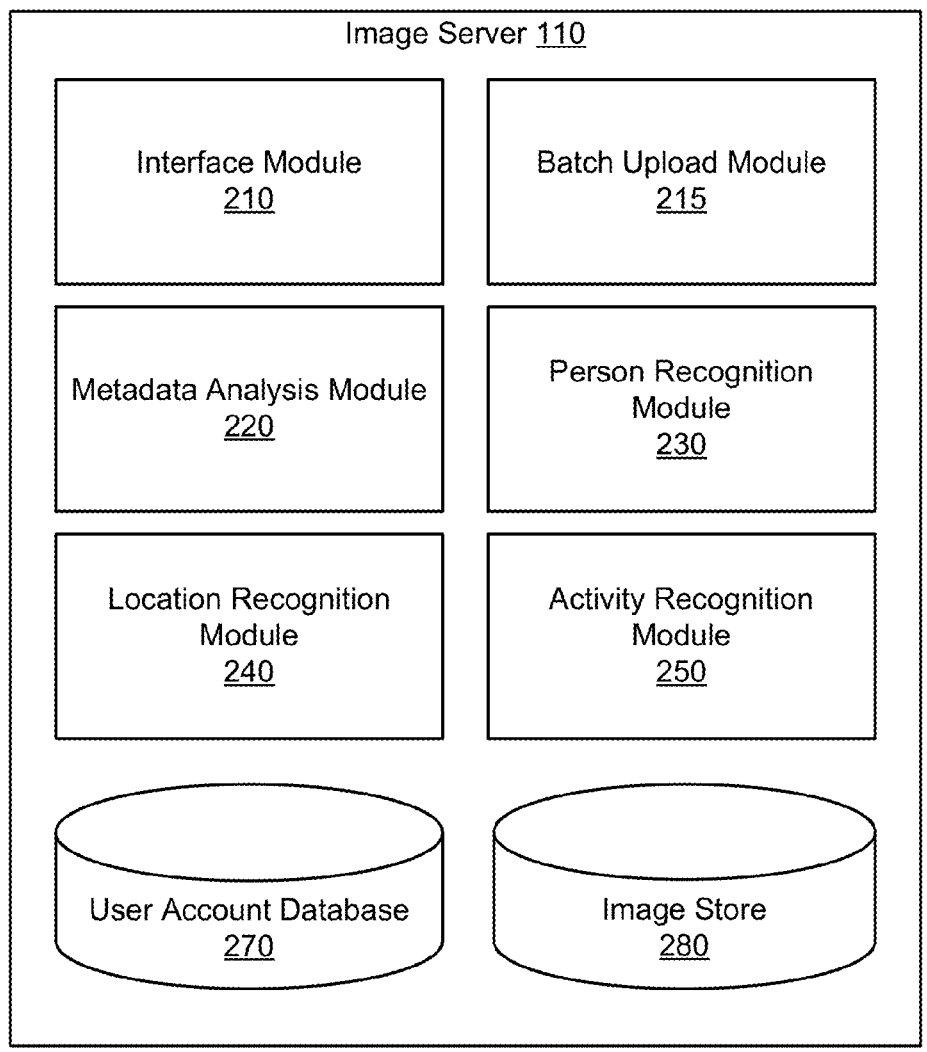
FIG. 2 is a high-level block diagram of the image server depicted in FIG. 1, in accordance with one embodiment.

FIG. 2 is a high-level block diagram of the image server 110 depicted in FIG. 1, in accordance with one embodiment. As shown, the image server 110 includes an interface module 210, a batch upload module 215, a metadata analysis module 220, a person recognition module 230, a location recognition module 240, an activity recognition module 250, a user account database 270, and an image store 280. Other embodiments of image server 110 include different and/or additional modules. In addition, the functions may be distributed among the modules in a different manner than described herein.

The interface module 210 connects to the client devices 130 over the network 120 and handles communications between the image server 110 and the client devices 130. The interface module 210 receives communications from users, such as upload images and tagging information, and passes the communications to the appropriate modules. The interface module 210 also receives outgoing data, such as images and notifications, from other modules and sends the data to the appropriate client devices 130.

The batch upload module 215 provides a user interface to client devices 130, via network 120, to enable users to upload a batch of images to the image server 110. A batch of images comprises one or more images that are uploaded to the image server 110 from a client device 130 that are processed together. For example, in one embodiment a user selects a folder on a client device 130 that contains multiple images and all of the images in the folder are uploaded to the image server 110. In another embodiment, a user uploads images from a client device 130 to the image server 110 using the batch upload module 215 where the images are stored as pending. The user interface provided to the client device 130 by the batch upload module 215 includes a "process images" control that triggers the processing of all pending images when clicked on or otherwise selected.

The metadata analysis module 220 receives images and analyzes the metadata in the images to find related images in both the image store 280 and other images in the same image batch. In one embodiment, the metadata analysis module 220 contains sub modules that attempt to match individual types of metadata. For example, the module 220 may contain a subject matching sub module for finding other images that include the same people, a timestamp analysis sub module for finding other images that were taken at approximately the same time, and a location analysis sub module for finding other images that were taken at approximately the same location. In alternative embodiments, the module may also contain sub modules for matching different types of metadata. The metadata analysis module 220 can then aggregate the results from the sub modules to generate a list of related images. As described below with reference to FIG. 3, the metadata analysis module 220 can also use the results from the sub modules to refine the location data 312 and activity 314 that are defined for an image 300.

The person recognition module 230 receives images uploaded by a user and identifies people known to the user in those images. In one embodiment, described in further detail below with reference to FIG. 4, the person recognition module 230 uses a combination of facial recognition algorithms and logical analysis to identify people within an image.

The location recognition module 240 receives images and identifies a named location to which the image corresponds. In one embodiment, described in further detail below with reference to FIG. 5, Global Navigation Satellite System (GNSS) metadata of an image is compared to GNSS positions corresponding to named locations. The location recognition module 240 assigns a named location to the image based on the GNSS metadata indicating close spatial proximity to one of the named locations.

The activity recognition module 250 receives images and identifies an activity (e.g., softball practice, at the fair, family dinner, etc.) to which the image corresponds. In one embodiment, described in further detail below with reference to FIG. 6, timestamp metadata for an image is compared to timestamp metadata for known activities (e.g., activities which were tagged in other images). The activity recognition module 250 assigns an activity to the image based on the timestamp metadata indicating a close temporal proximity between the image and a specific known activity. The activity recognition may also consider spatial proximity between the image and a known activity in determining whether the image corresponds with a specific known activity.

The user account database 270 comprises one or more data storage devices that hold information about user accounts. Typically, when a user wishes to access the services provided by the image server 110 the user will login by providing authentication data (for example a username and password) that are verified against user records stored in the user account database 270. In one embodiment, each user account contains a unique identifier for the account, at least one piece of contact information for the corresponding user (e.g., an email address), billing data for the user (e.g., credit card information), and links to the user's accounts on external social networking services (e.g., FACEBOOK® or TWITTER®). A user account can also be a shared account that contains contact information, billing data, or social networking links corresponding to multiple users. Shared accounts allow people who frequently take photos together (e.g., a married couple, close friends, or people with some other relationship) to access the image server 110 with the same user account. Since a user account is likely to contain sensitive data, the user account database 270 may be encrypted or subject to other data security techniques to protect the privacy of users.

The image store 280 comprises one or more data storage devices (which may be the same devices that make up the user account database 270) that hold images uploaded by users. As described in further detail below, with reference to the specific embodiment illustrated by FIG. 3, images are stored with corresponding metadata. The term metadata is used herein to encompass all data that provides information relating to one or more corresponding images in the image store 280. For convenience, the individual items stored with the image store 280 are referred to herein as photos and/or images. However, the image store 280 may also include videos. As such, the terms "photo" and "image" as used herein should be taken to include videos.

Figure 3:
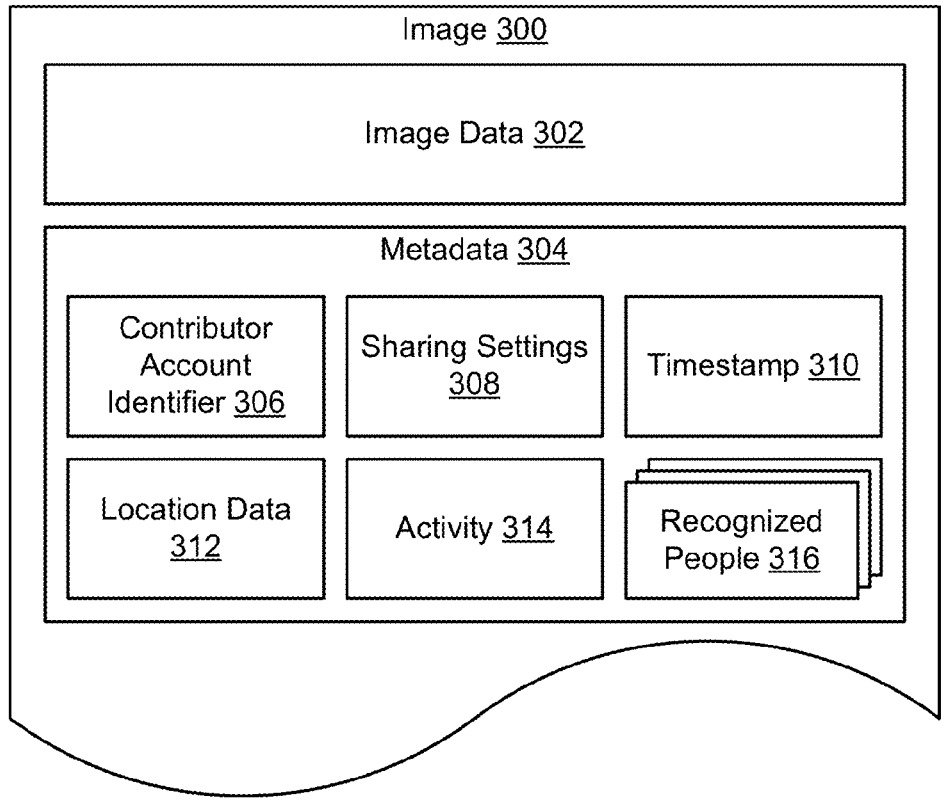
FIG. 3 is a high-level block diagram illustrating an example data structure for an image, in accordance with one embodiment.

FIG. 3 is a block diagram illustrating an example data structure for an image 300 such as an image from the image store 280, in accordance with an embodiment of the invention. The image 300 contains image data 302 and metadata 304. The metadata 304 includes a contributor account identifier 306, sharing settings 308, a timestamp 310, location data 312, an activity 314, and tags of recognized people 316. The metadata 304 may include additional or different information that is not explicitly shown in FIG. 3, such as identifying information for the camera that was used to capture the image data 302, the optical settings that were used to capture the image data 302 (e.g., shutter speed, focal length, f-number), or the resolution of the image data 302.

The image data 302 is the visual content of the image 300. As described with reference to the image store 280 of FIG. 2, the image data 302 may be a photograph or a video. The image data 302 may be compressed using any combination of lossless or lossy compression methods known in the art, such as run-length encoding, entropy encoding, chroma subsampling, transform coding, and the like. The image data 302 may also include a stored perceptual value for images, such as a perceptual hash, for use in finding pixel-similar images. The stored perceptual data is used to find pixel-based similarities to determine if two images are duplicates or near duplicates.

The contributor account identifier 306 identifies the user account that was used to upload the image 300 to the image server 110. In one embodiment, the contributor account identifier 306 is the unique account identifier described with reference to the user account database 270 of FIG. 2. Alternatively, the contributor account identifier 306 may be an item of contact information corresponding to the contributor account or some other piece of identifying information.

The sharing settings 308 is a list of identifiers for additional user accounts and sharing privileges that have been given to each additional user account. Sharing privileges specify the level of access that the contributing user has granted to the additional user accounts. For example, a first user account may only be allowed to view the image, whereas a second user may be allowed to view the image and add tags for additional recognized people 316. In general, the sharing settings 308 may be used to specify a different set of sharing privileges for each additional user account, and each set of sharing privileges specifies specify which items of metadata 304 the user account is allowed to change. Defining sharing settings 308 in the metadata 304 of an image 300 beneficially allows individual images 300 to be shared between users. Sharing settings are described in further detail in co-pending U.S. patent application Ser. No. 13/525,134, filed Jun. 15, 2012, titled "Image Sharing with Facial Recognition Models," which has been incorporated by reference herein.

The location data 312 is information that identifies where the image 300 was taken. The location data 312 may include, for example, coordinates from a global navigation satellite system (GNSS) which are retrieved and recorded by the camera at the time the image 300 is taken. Alternatively, a user may manually add location data 312 to an image at some point after the image 300 is taken.

After the image 300 is uploaded to the image server 110, the metadata analysis module 220 may also analyze the GNSS coordinates in the location data 312 and operate in conjunction with the location recognition module 240 to add a more descriptive location descriptor to the location data 310. For example, the metadata analysis module 220 may attempt to match GNSS coordinates to predefined regions with labels such as "Home," "Soccer Field," or "San Francisco." The determination of locations based on metadata analysis is described in further detail below with reference to FIG. 5. Alternatively or additionally, the location of an image can be determined in some circumstances based on the IP address of the device used to upload the image at the time of capture of the image. For example, if a user uploads an image from a smart phone at the time of the capture, but the uploaded image does not contain geo-data, the IP address of the user's device at the time the user uploaded the image can be used to estimate the location of the image.

The timestamp 310 is the date and time at which the image data 302 was captured. The timestamp 310 may be retrieved from an internal clock of the camera and recorded at the time the image 300 is taken, or it may be manually added or modified by the user after the image 300 is taken.

The activity 314 identifies an event at which the image data 302 was captured (e.g., "soccer game," "summer vacation," "birthday party," "high school graduation," etc.) or an action in which the people in the image are engaged (e.g., "playing soccer," "swimming," "eating cake," "graduating from high school," etc.). A user may manually define the activity 314 based on pre-existing knowledge of the context in which the image 300 was taken. For example, if a user took a series of images at a soccer game that occurred between 2 PM and 5 PM on Saturday at a local park, then the user can manually define the activity 314 for those images as "playing soccer" or "soccer game" or "Saturday afternoon soccer game" or any other descriptive text for the activity that the user chooses. After the user uploads the image 300 to the image server 110, the metadata analysis module 208 may also operate in conjunction with the activity recognition module 250 to compare the timestamp 310 to the timestamps 310 of other images 300 in the image store 212 and assign an activity 314 to the image 300. The determination of activities based on metadata analysis is described in further detail below with reference to FIG. 6.

The tags for recognized people 316 identify people who are shown in the image data. The tags 316 may be manually added by the user, automatically added by the facial recognition module 318 based on facial recognition models, or on a combination of automatic facial recognition and user input. In one embodiment, the tags 316 are links to facial recognition models in the facial recognition model store 460. Alternatively, each tag 316 may simply specify a name for the recognized person. In this case, each facial recognition model may be stored in association with the appropriate name so that the tag 316 can still be used to identify a corresponding facial recognition model.

As mentioned above, the metadata 304 may include additional or different information that is not explicitly shown in FIG. 3. For example, the metadata 304 may include the specific camera type and model that was used to capture the image and a profile of enhancement settings for the camera type and model. In one embodiment, the enhancement settings are automatically applied to images taken using the camera type and model corresponding to the profile. The user can optionally turn off or adjust the enhancement settings for various images, which can also be tracked, for example, by the metadata analysis module 220, to make adjustments in the profile of enhancement settings to be applied in the future to the user's images taken with the same camera type and model. Additionally, the enhancement settings for a cluster of similar images can be automatically adjusted based on a user adjusting the enhancement settings for just one of the cluster of images. In both instances, the automatic adjustment of enhancement settings for groups of images saves the user from having to implement tedious repetitive adjustments for each individual image.

Person Recognition

Figure 4:
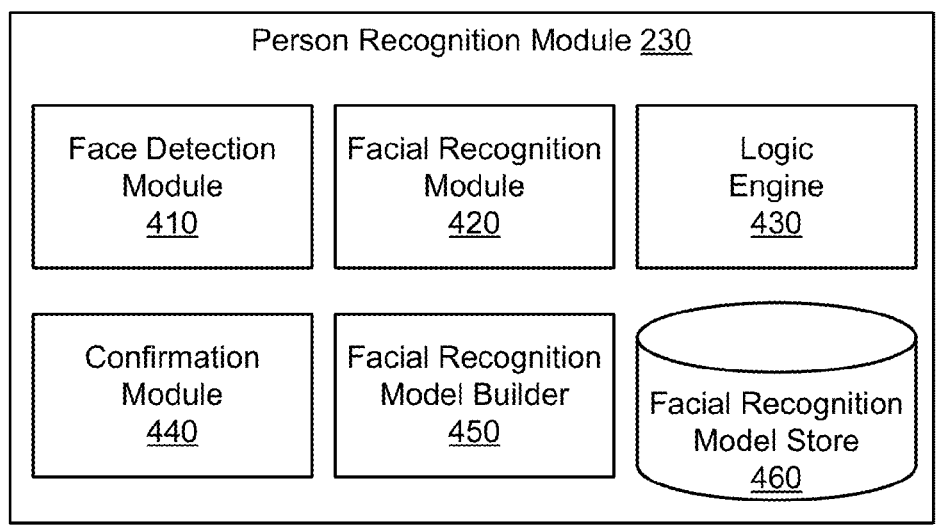
FIG. 4 is a high-level block diagram illustrating the person recognition module depicted in FIG. 2, in accordance with one embodiment.

FIG. 4 is a high-level block diagram illustrating the person recognition module 230 depicted in FIG. 2, in accordance with one embodiment. As shown, the person recognition module 230 includes a face detection module 410, a facial recognition module 420, a logic engine 430, a confirmation module 440, a facial recognition model builder 450, and a facial recognition model store 460. Other embodiments of person recognition module 230 include different and/or additional modules. In addition, the functions may be distributed among the modules in a different manner than described herein.

The face detection module 410 receives a batch of images and identifies one or more portions of the images that correspond to unidentified faces. For example, if the batch includes a family portrait showing two parents and three children, the face detection module 410 identifies the five portions of the photo that correspond to the faces of the five people in the photo, assuming that the faces of all five family members are displayed. If the batch includes a second version of the family portrait in which one of the children is turned away from the camera, the face detection module 410 identifies the four portions of the photo that correspond to the faces of the two parents and the two children that were looking at the camera. Thus, assuming the two versions of the family portrait are the entire batch of images, the output of the face detection module 410 is nine image portions (five from the first version and four from the second version), with each image portion showing a single face. In one embodiment, the face detection module 410 copies each portion of the input images that corresponds to a face and saves each portion as a working file.

Once the face detection module 410 has identified one or more image portions that show faces, the facial recognition module 420 performs facial recognition individually for each face. In one embodiment, the facial recognition module 420 sends the faces, via the network 120, to a third party server (not shown) that provides a facial recognition service, such as FACE.COM®. The faces may be sent with along with a list of people to match against, such as the account owner's known friends and family, and may be sent with facial recognition models for known people. If no list is provided, the third party facial recognition service attempts to match the portions to known persons. For each face sent, the third party facial recognition service returns data to the facial recognition module 420 indicating possible matches (there may be no matches) along with a corresponding measure of likelihood, such as a percentage score. The data may also include additional parameters relating to the faces shown in each portion, such as an estimated age, a predicted gender, an estimated angle between the face and the camera, whether the eyes are open, and the like. In another embodiment, instead of sending the detected faces to a third-party facial recognition service, the facial recognition module 420 directly applies a facial recognition algorithm to compare the faces to the facial recognition models stored in the facial recognition model store 460.

The logic engine 430 processes the data indicating possible matches from the facial recognition module 420 to determine a provisional tag for each face identified by the face detection module 410. The logic engine 430 applies a set of logic rules to the possible matches at the image-wide, batch, and/or corpus (i.e., all images in the system) level to generate additional matching data. The logic rules include rules such as: a face detected in an image cannot be the face of a person who was not yet born when the image was taken, two faces detected in the same image cannot both be the faces of one person, and a face detected in each of two different images that were taken at approximately the same time but at different locations cannot both be faces of one person. The logic rules also include rules such as: a person is less likely to correspond to a face if their actual age at the time the image was taken is significantly different from the predicted age for the face; a person is less likely to correspond to a face if the face is also found to be a good match for someone the person has been previously mistaken for by the system; a person is less likely to correspond to a face if the face matches well to one or more other people; and a person is less likely to correspond to a face if the person's gender is different from the predicted gender for the face.

In one embodiment, the logic engine 430 applies the logic rules to improve the accuracy in tagging recognized people in the images by first finding the highest likelihood match in an image and preliminarily tagging that face with the corresponding matched person. As the same person cannot appear more than once in the image, any other matches for that person are removed. The logic engine 430 then finds the next highest match and adds a preliminary tag and removes other matches in the same manner. If at any point, an identified face in the image has no matches (either because the facial recognition module 420 returned no matches, or all the possible matches have been ruled out) the logic engine 430 adds a preliminary tag for an unknown person to the face. This process is repeated until all faces in the image have been assigned a preliminary tag. For example, a photo contains a first face determined to be an 80% match for Sawyer and a 20% match for Jasper as well as a second face determined to be a 60% match for Sawyer and a 50% match for Jasper. The logic engine 430 will first select the 80% match and tag the first face as corresponding to Sawyer. This eliminates the possibility that the second face is Sawyer, so the second face is tagged as corresponding to Jasper, the next highest match. Note that in this example, the second face was tagged as Jasper, even though the facial recognition module 420 identified the second face was more likely to correspond to Sawyer than to Jasper.

In one implementation, the logic rules are used by the logic engine 430 to first create a list of possible matches for each face. The possible matches may include other unidentified faces (a group of faces) or other identified faces (corresponding to recognized people). In one embodiment, the third party face recognition service provides a probability of matches and likelihood of gender. Thus, the logic engine 420 can apply weightings to each suggested match, which consequently make certain suggested matches increase in likelihood and others decrease to the point of removing them from consideration as a match.

In one implementation, the weightings are based on:
Date of the image relative to the age of the suggested recognized person.
Predicted gender of the face relative to the gender of the recognized person.
Strength of suggestion to other faces (unidentified and identified) that have been confirmed in the past to not be the recognized person.
Strength of suggestion to other faces in the same image or to other faces that have a strong suggestion to other faces in the same image.
Time and location of the capture of the image versus the known time and location of the identified faces to which the suggestions are being made.

The result of the logic engine 430 is a greatly improved accuracy of the face match suggestions presented to the user.

Figure 9:
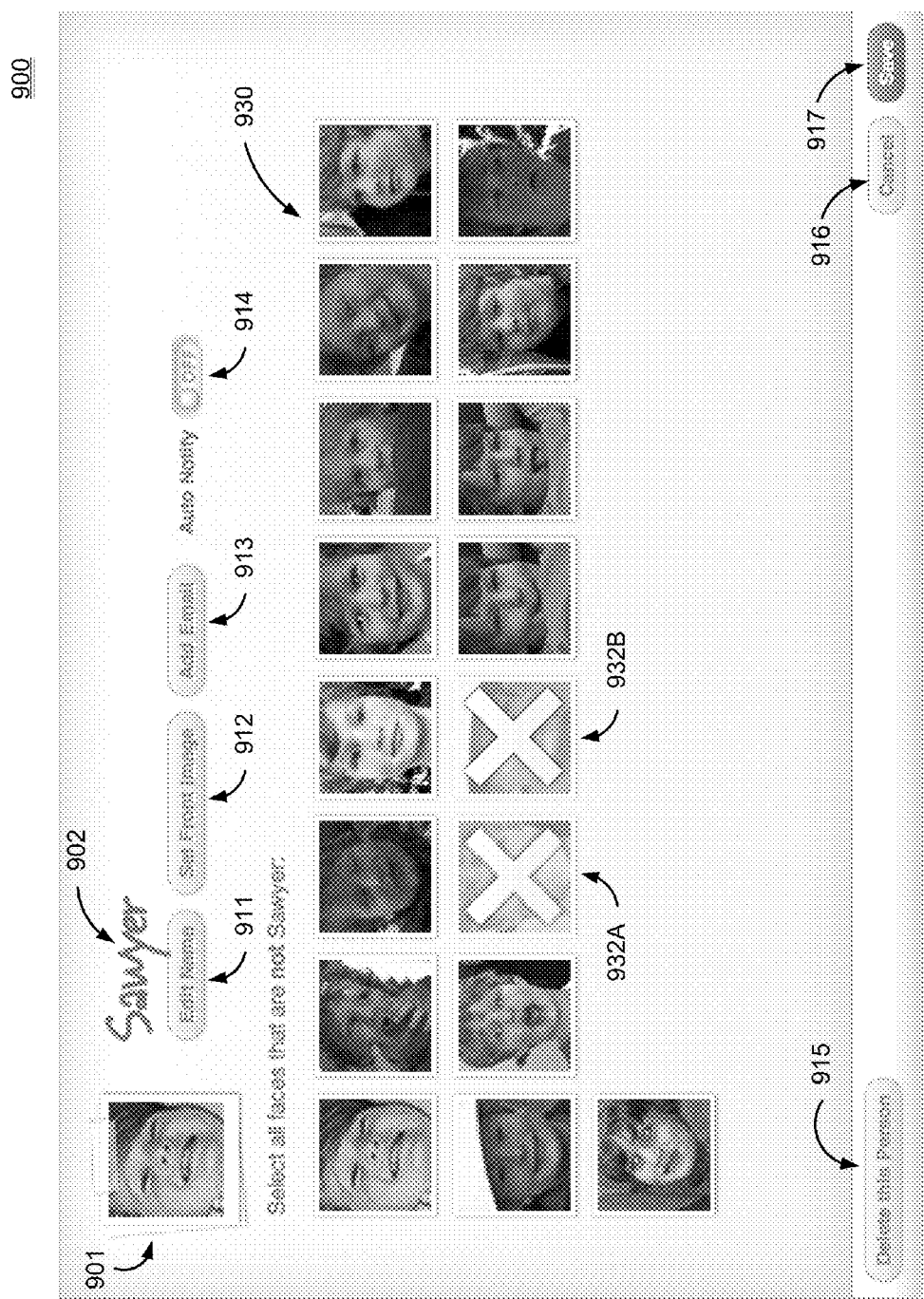
FIG. 9 is a screenshot illustrating an exemplary user interface for user verification of recognized faces, in accordance with one embodiment.

The confirmation module 440 provides a user interface to client devices 130, via network 120, with which a user can confirm or reject the preliminary tags assigned to an image batch by the logic engine 430. In one embodiment, for each person preliminarily tagged in one or more images 300, the user is presented with a plurality of faces tagged as corresponding to that person in a grid and prompted to indicate any faces that have been incorrectly tagged. FIG. 9 is a screenshot 900 illustrating an exemplary user interface for user verification of recognized faces, in accordance with one embodiment.

In the example shown in FIG. 9, the user interface optionally includes contextual information, such as images of the same person that have already been confirmed, to inform the user for which person verification is currently being requested. In this example, the contextual information is the name 902 (in this case, "Sawyer") of the person that has been recognized and a representative image 901 of the person, known as a front image. In one embodiment, additional context is provided by displaying face images previously confirmed as corresponding to the person in the grid alongside the newly recognized faces that are being presented for confirmation. This also enables users to remove faces that they have previously incorrectly verified as corresponding to the person. The user may change the name by selecting the "edit name" control 911 and change the front image by selecting the "select front image" control 912. The user may also add an email address for the person by selecting the "add email" control 913. In one embodiment, the email address is used to automatically notify the person when they are tagged in an image. The user can toggle auto-notifications on and off by selecting the "auto-notify" control 914. The user interface also includes a control to delete a person entirely 915. If the user selects the "delete this person" control 915, the facial recognition model corresponding to the person is deleted from the facial recognition model database 460. The user may be requested to confirm the request to delete a person in order to reduce the risk of the user accidentally deleting facial recognition models. The verification of recognized faces is implemented by displaying the face images identified as corresponding to a person (in this case, Sawyer) in a grid 930. The confirmation module 440 presents a grid 930 such as the one shown in FIG. 9 to the user for each person identified in one or more of the images in a batch. The user is prompted to select (e.g., click on) any faces shown that have been incorrectly identified (i.e., are not Sawyer). The faces that have been selected by the user (932A and 932B) are visually distinguishable from those that have not, in this case by placing a large cross over the face. When the user has finished reviewing the identified faces, the user can select to either confirm the unselected faces as verified by selecting the "save" control 917 or cancel the process by selecting the "cancel" control 916.

The confirmation module 440 preliminarily retags as corresponding to an unknown person any faces the user marks as incorrectly tagged. Alternatively, the user can manually enter an identity for incorrectly tagged faces. The tagging of any face the user does not indicate as incorrect is verified, and the confirmation module 440 removes the preliminary status of the tag. For example, when a tag is preliminary it may be stored in the memory of the image server 110 and when verified the confirmation module 440 adds the recognized people to the corresponding image's metadata 304.

Referring again to FIG. 4, once the user has verified or rejected all of the recognized faces, the person recognition module 230 optionally attempts to recognize all faces with a preliminary "unknown person" tag by iterating a version of the basic process described above. It does not matter whether that tag is the result of the facial recognition module 420 returning no matches, the logic engine 430 invalidating all matches, or the user rejecting a match as part of the verification process. The facial recognition module 420 makes one or more groups of similar faces, known as "an unknown person model," based on the data previously generated by the facial recognition algorithm for the unknown faces. The logic engine 430 applies the logic rules to determine if the faces in each group can belong to the same person and selects the most likely match to the rest of the group if the inclusion of two or more faces in the group represents a logical conflict (e.g., two of the unknown faces in a group are from the same image). The confirmation module 440 then presents the groups of unknown faces to the user in a similar manner to that shown in FIG. 9 and requests the user to provide a name for the person and indicate any faces that should not be included in the group. In one embodiment, this process is iterated until all of the faces identified in a batch of images have been successfully recognized. In other embodiments other thresholds for completion are used, such as successful recognition of 90% of all faces, or a maximum number of iterations (e.g., 3). Additionally, the groups themselves are compared together to look for possible groups that can be consolidated together to create larger groups of similar faces.

The facial recognition model builder 450 updates the facial recognition models stored in the facial recognition model database 460 based on the results of the facial recognition performed by the other modules of the person recognition module 230. In one embodiment, the facial recognition model builder 450 adds all faces verified as corresponding to known people to the corresponding facial recognition models. Optionally, any instances of the user rejecting a face match are recorded in the negative model (described in more detail below) for the person that the face was incorrectly identified as by the facial recognition module 420 and logic engine 430. In one embodiment, the facial recognition model builder 450 only updates the facial recognition model when significant changes are made. For example, if any face is removed, the model is regenerated without the eliminated face. If any new faces are added, the model is updated when the new faces would contribute to a percentage change in the model, such as 5% or 10% change, but other thresholds may be used instead.

The facial recognition model store 460 comprises one or more data storage devices that hold facial recognition models, such as those built by the facial recognition model builder 450. A facial recognition model includes an identifier for a specified person (e.g., a name, a user ID, etc.) and one or more images that show the face of a specified person. A facial recognition model may also include one or more facial images that have been confirmed as not showing the specified person (a "negative model"). In one embodiment, a facial recognition model also contains optional additional data that describes the specified person, such as the person's age, gender, connections to other people known to the person recognition module 230 (family, friends, colleagues, etc.), commonly visited locations (home, work, gym, etc.), and/or other descriptive information of the specified person.

In one embodiment, the person recognition module 230 also determines the importance of any unidentified faces to a user. If the same face only appears a few times in the user's images that are all from the same time and same location, the person recognition module 230 infers that the face is less important to the user than an unidentified face that appears in the user's images at multiple times and from multiple locations. In the first scenario, it is likely that the unidentified face is just from a crowd of people that the user does not personally know who are standing behind the user's identified friends who are the main subjects of a series of photos taken one day. In the second scenario, because the face repeatedly occurs in the user's photos in different contexts, the person recognition module 230 infers that the face is important to the user because it is of a person that the user repeatedly encounters. The person recognition module 230 may assign an importance value to faces based on these criteria. In one implementation, the faces determined to be more important are presented to the user first for identification and/or confirmation because it is more likely that the user will take advantage of the identification of people who are important to the user to base other decisions such as sharing and organization of images on these more important people.

Location Recognition

Figure 5:
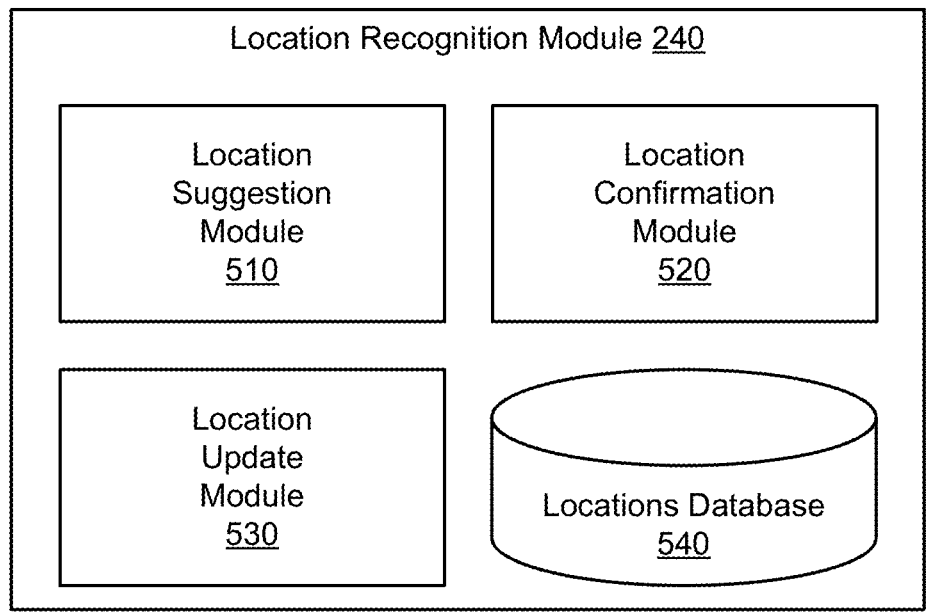
FIG. 5 is a high-level block diagram illustrating the location recognition module depicted in FIG. 2, in accordance with one embodiment.

FIG. 5 is a high-level block diagram illustrating the location recognition module 240 depicted in FIG. 2, in accordance with one embodiment. As shown, the location recognition module 240 includes a location suggestion module 510, a location confirmation module 520, a location update module 530, and a locations database 540. Other embodiments of location recognition module 240 include different and/or additional modules. In addition, the functions may be distributed among the modules in a different manner than described herein.

The location suggestion module 510 receives a batch of images 300 and attempts to determine a suggested location for each image based on the image's metadata 304. In one embodiment, the location suggestion module 510 queries the locations database 540 for all locations available for the user that uploaded the batch (as indicated by the contributor account identifier 306). For each image 300 in the batch, the location suggestion module 510 compares a GNSS position included in the image's location data 316 to the list of known locations returned from the locations database 540. If the GNSS position falls within a geographic area that corresponds to a known location, the location suggestion module 510 preliminarily tags the image 300 with that location. If the GNSS position of an image 300 falls within the geographic areas corresponding to more than one known location, the location suggestion module 510 may select the location closest to image's GNSS position (e.g., by comparing the distance between the GNSS position and the center point of each candidate location). The location suggestion module 510 then preliminarily tags the image 300 with the selected location. If the GNSS position of an image 300 in the batch does not fall within the geographic area of any known location, the image is preliminarily tagged as corresponding to an unknown location.

Not all image capturing devices include position data in images on creation. For example, most digital SLR cameras are not location aware and as such cannot add position metadata to images. In one embodiment, the location suggestion module 510 considers other location data corresponding to the user who owns an image. For example, if on a day trip a user takes some photos with a cell phone camera and others with a digital SLR camera, the photos from the cell phone camera are likely to contain location metadata, while those taken by the digital SLR camera most likely do not. The location suggestion module 510 automatically preliminarily tags any photos without position metadata taken within a fixed time (e.g., one hour, one day, etc.) of a photo from a known location with the same location. Optionally, each time a photo is tagged in this manner, the timer is reset. For example, a user takes a photo with a location aware device at 9 am and then begins taking photos with a non-location aware device. The second photo is taken at 9:30 am. Assuming the fixed time is one hour, the second photo is tagged as corresponding to the same location as the first photo. The user then takes a third photo at 10:15 am. Although this is more than an hour after the first photo, it is within an hour of the second photo, and the second photo reset the one-hour timer, so the third photo is also tagged as corresponding to the same location as the first photo. The user then takes a fourth photo at 1 pm. As this is more than an hour after the third photo, the location suggestion module 510 does not assume it is from the same location is the other photos and marks the photo as corresponding to an unknown location. In other embodiments, different methods of inferring the location of images are used. For example, the location suggestion module 510 may monitor the activity level of the user (e.g., how many photographs per day the user is taking) and suggests clustering all images from a period of unusually high activity into a single location group as such images are likely to correspond to a particular location, such as a vacation spot.

The location confirmation module 520 provides a user interface to client devices 130, via network 120, with which a user can confirm or reject the preliminary location tags assigned to an image by the location suggestion module 510. In one embodiment, for each location with preliminarily tagged images 300, the user is presented with all such images in a grid in a similar manner to that described with reference to facial recognition and FIG. 9 above. Optionally, the user is also shown images of the same location that have already been confirmed to provide additional context. The location confirmation module 520 prompts the user to indicate any images that have been incorrectly tagged as corresponding to the location. Any images 300 the user marks as incorrectly tagged are preliminarily retagged as corresponding to an unknown location. Alternatively, the user can manually enter a location for incorrectly tagged images 300. The location tag of any image 300 the user does not indicate as incorrect is verified, thereby removing its provisional status. For example, when a tag is provisional it may be stored in the memory of the image server 110 and when verified the location confirmation module 520 adds the location to the corresponding image's metadata 304.

The location update module 530 processes images preliminarily tagged as corresponding to an unknown location. In one embodiment, the location update module 530 places the images from unknown locations into groups based on spatial proximity. In one embodiment, the geographic area of a location is defined by a central GNSS position and an extent distance. The location corresponds to a circular area with radius equal to the extent distance centered at the central GNSS position. The central GNSS point is determined by finding an average of the GNSS positions of every image in the group of images. The radius of extent may be set to a default fixed value, or a user selected value may be used. In other embodiments, other methods are used to define the geographic areas of locations, e.g., user defined borders on a map. For example, if the images with an "unknown location" tag comprise a first cluster with GNSS positions within 100 yards of each other in San Francisco, and a second cluster with GNSS positions within a mile of each other in Seattle, the location update module 530 places the images into two groups: images with GNSS metadata corresponding to San Francisco; and images with GNSS data corresponding to Seattle. The location update module 530 presents each group to the user at the client device 130 (via network 120) and prompts the user to indicate any images 300 that should not be in the group in the same manner as described above for known locations, and may prompt the user to select a place name for the location. By indicating any images that do not belong in the group, the user verifies that the remaining images are correctly grouped. The location update module 530 then determines a geographic area for the new location and adds the new location to the locations database 540.

The locations database 540 comprises one or more data storage devices that store data objects known as "locations" that describe a place known to a user account. A location includes a place name and a defined geographic area. Locations may be either specific to a given user account (e.g., a "home" location) or generic (e.g., "Golden Gate Park"). A generic location may be used to suggest a place name for a location within the defined geographic area corresponding to the generic location.

Activity Recognition

Figure 6:
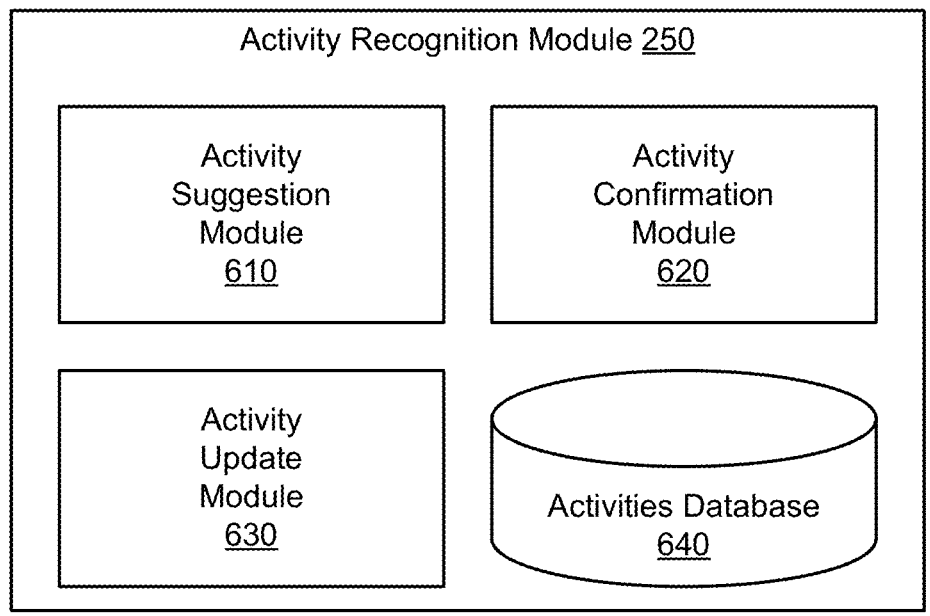
FIG. 6 is a high-level block diagram illustrating the activity recognition module depicted in FIG. 2, in accordance with one embodiment.

FIG. 6 is a high-level block diagram illustrating the activity recognition module 250 depicted in FIG. 2, in accordance with one embodiment. As shown, the activity recognition module 250 includes an activity suggestion module 610, an activity confirmation module 620, an activity update module 630, and an activities database 640. Other embodiments of activity recognition module 250 include different and/or additional modules. In addition, the functions may be distributed among the modules in a different manner than described herein.

The activity suggestion module 610 receives a batch of images 300 and attempts to determine a suggested activity for each image based on the image's metadata 304. In one embodiment, the activity suggestion module 610 queries the activities database 640 for all activities available for the user that uploaded the batch (as indicated by the contributor account identifier 306). For each image 300 in the batch, the activity suggestion module 610 compares a GNSS position included in the image's location data 312 and a timestamp 310 to the list of known activities returned from the activities database 640. If the GNSS position and timestamp both fall within ranges that correspond to a known activity, the activity suggestion module 610 preliminarily tags the image 300 with that activity. In one implementation, alternatively or additionally, activities can be suggested to a user that has occurred at the location of the image on or around the time of year that the image was taken. If the GNSS position and timestamp of an image 300 correspond to more than one known activity, the activity suggestion module 610 selects the activity corresponding to the image closest in time, or closest to the image's GNSS position (e.g., by comparing the distance between the image's GNSS position and the GNSS position of each activity), or may use other methods to select a suggested activity from among several options. The activity suggestion module 610 then preliminarily tags the image 300 with the selected activity. If the GNSS position and timestamp of an image 300 in the batch do not correspond to any known activity, the image is preliminarily tagged as corresponding to an unknown activity.

In other embodiments, other methods for identifying activities are used instead or as well as those described above. For example, the activity suggestion module 610 can scrape activities corresponding to a location from internet materials related to that location, such as comments on photographs on FLICKR™ that have similar position data. The activity suggestion module 610 can also be configured to infer activities based on the people identified in an image. For example, if a group of people (e.g., three) are identified in a large number of photographs (e.g., more than five) that have been confirmed to correspond to an activity, any other photos containing the same group of people can be provisionally tagged as corresponding to the same activity.

The activity confirmation module 620 provides a user interface to client devices 130, via network 120, with which a user can confirm or reject the preliminary tags assigned to an image batch by the activity suggestion module 610. In one embodiment, for each activity with preliminarily tagged images 300, the user is presented with all such images in a grid in a similar manner to that described above with reference to facial recognition and FIG. 9. Optionally, the user is also shown images of the same activity that have already been confirmed to provide additional context. The activity confirmation module 620 prompts the user to indicate any images that have been incorrectly tagged as corresponding to the activity. Any images 300 the user marks as incorrectly tagged are preliminarily retagged as corresponding to an unknown activity. Alternatively, the user can manually enter an activity for incorrectly tagged images 300. The activity tag of any image 300 the user does not indicate as incorrect is verified, thereby removing its provisional status. For example, when a tag is provisional it may be stored in the memory of the image server 110 and when verified, the activity confirmation module 620 adds the activity to the corresponding image's metadata 304.

The activity update module 630 processes images preliminarily tagged as corresponding to an unknown activity. In one embodiment, the activity update module 630 places the images with unknown activities into groups based on temporal proximity. For example, if the images with an "unknown activity" tag comprise a first cluster with timestamps of Jan. 5, 2012, and a second cluster with timestamps of Oct. 23, 2011, the activity update module 630 places the images into two groups: images with timestamps on January 5; and images timestamps on October 23. The activity update module 630 presents each group to the user at the client device 130 (via network 120) and prompts the user to indicate any images 300 that should not be in the group in the same manner as described above for known activities. By indicating any images that do not belong in the group, the user verifies that the remaining images 300 are correctly grouped. Once the activity update module 630 has identified one or more groups of images that correspond to unknown activities, it prompts the user to provide a name for each new activity. The activity update module 630 optionally then determines a geographic area and time range for each new activity and adds the new activities to the activities database 640. In one embodiment, the activity update module 630 determines a circular geographic area with a central GNSS point and radius of extent for each new activity in the same manner as described above for new locations. In other embodiments, other methods of determining the geographic area for an activity are used, such as using the position of the known location from the locations database 540 that is closest to the GNSS positions of the images 300. In one embodiment, the activity update module 630 defines the time range for an unknown activity to begin at the time indicated by the earliest image time stamp corresponding to the activity and end at the time indicated by the latest time stamp corresponding to the activity. In other embodiments, other methods of determining the time range for an activity are used, such as using a fixed time period for all activities or prompting the user to provide beginning and end times.

The activities database 640 comprises one or more data storage devices that hold data objects known as "activities" that describe an event or action (e.g., softball practice, at the fair, family dinner, etc.) portrayed in one or more images. An activity includes an activity name, and may include a geographic position and a time range. Activities may be either specific to a given user account (e.g., "Sawyer's graduation") or generic (e.g., "49er's game"). In one embodiment, the time range for an activity is defined by a start time and an end time, both expressed in terms of a number of seconds elapsed since midnight Universal Coordinated Time (UTC), Jan. 1, 1970 (UNIX time), and the geographic position is defined by a GNSS position or named location corresponding to GNSS position. In some embodiments, activities may be defined to repeat with a regular schedule (e.g., a "Saturday softball practice" event occurs every Saturday between 1 pm and 3 pm). In other embodiments, other methods are used to define the time range that corresponds to an activity.

Example Methods of Assisted Tagging

Figure 7:
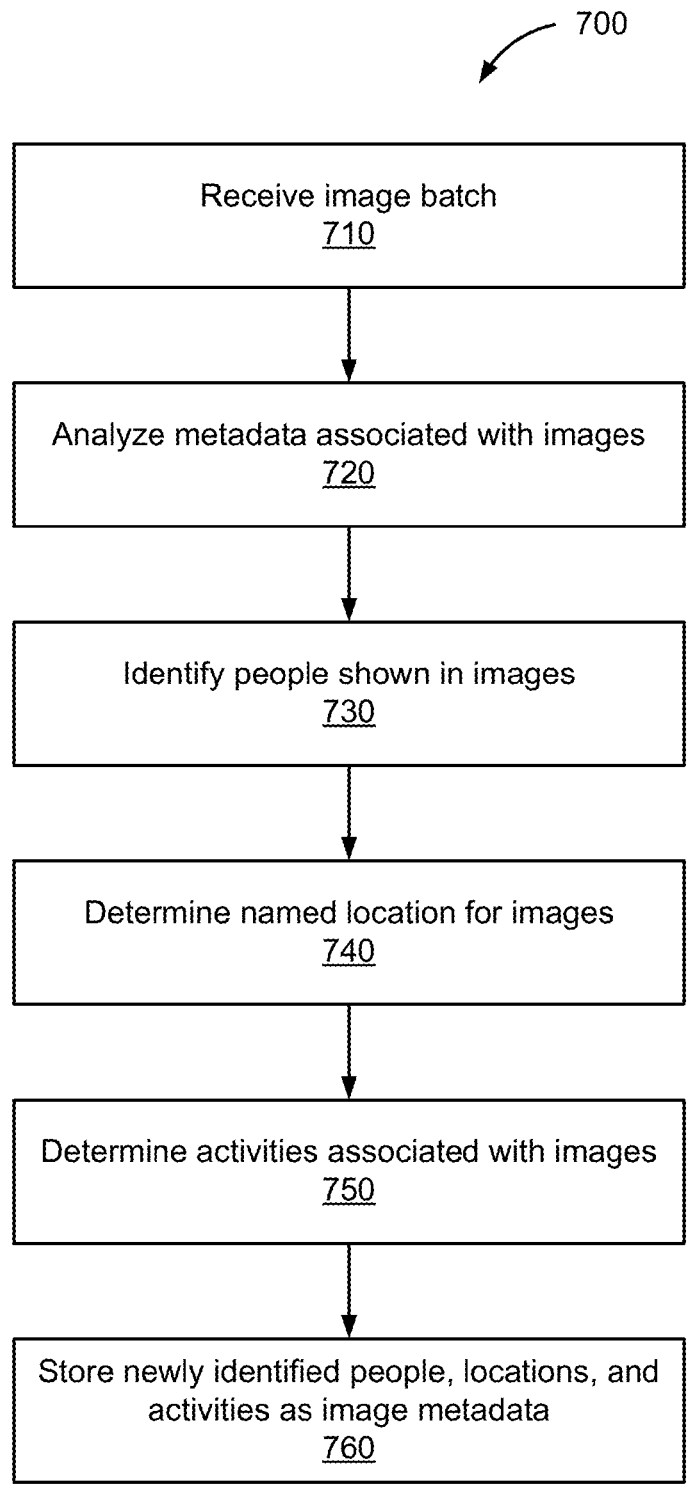
FIG. 7 is a flow chart illustrating a process for assisted tagging of a batch of images, in accordance with one embodiment.

FIG. 7 is a flow chart illustrating a process 700 for assisted tagging of a batch of images, in accordance with one embodiment. FIG. 7 attributes the steps of the method to the image server 110. However, some or all of the steps may be performed by other entities. In addition, some embodiments may perform the steps in parallel, perform the steps in different orders, or perform different steps, without departing from the teachings provided by the description herein.

Initially, the image server 110 receives 710 a batch of images. The batch includes one or more images uploaded to the image server 110 by a user from a client device 130 using the user interface provided by the batch upload module 215.

The metadata analysis module 220 analyzes 720 metadata associated with each image to determine people, locations, and activities that have already been identified as corresponding to the image. The metadata analysis module 220 also extract location and timestamp data from the metadata 304 associated with each image 300, where available.

The person recognition module 230 identifies 730 people shown in the images using facial recognition and a logic engine 430. The process of facial recognition and the implementation of the logic engine 430 have been described above with reference to FIG. 4.

The location recognition module 240 determines 740 named locations for the places where the images have been taken. The process of recognizing locations has been described above with reference to FIG. 5.

The activity recognition module 250 determines 750 activities shown in the images. The process for recognizing activities has been described above with reference to FIG. 6.

Finally, the newly identified people, locations, and activities are added to the metadata stored in the corresponding images. Accordingly, the accurate tagging of people, locations, and activities for even large sets of images can be more conveniently accomplished using the assisted tagging techniques described herein. As a result, the images become searchable, displayable, and shareable using the people, location, and activity tags that have been created.

Figure 8:
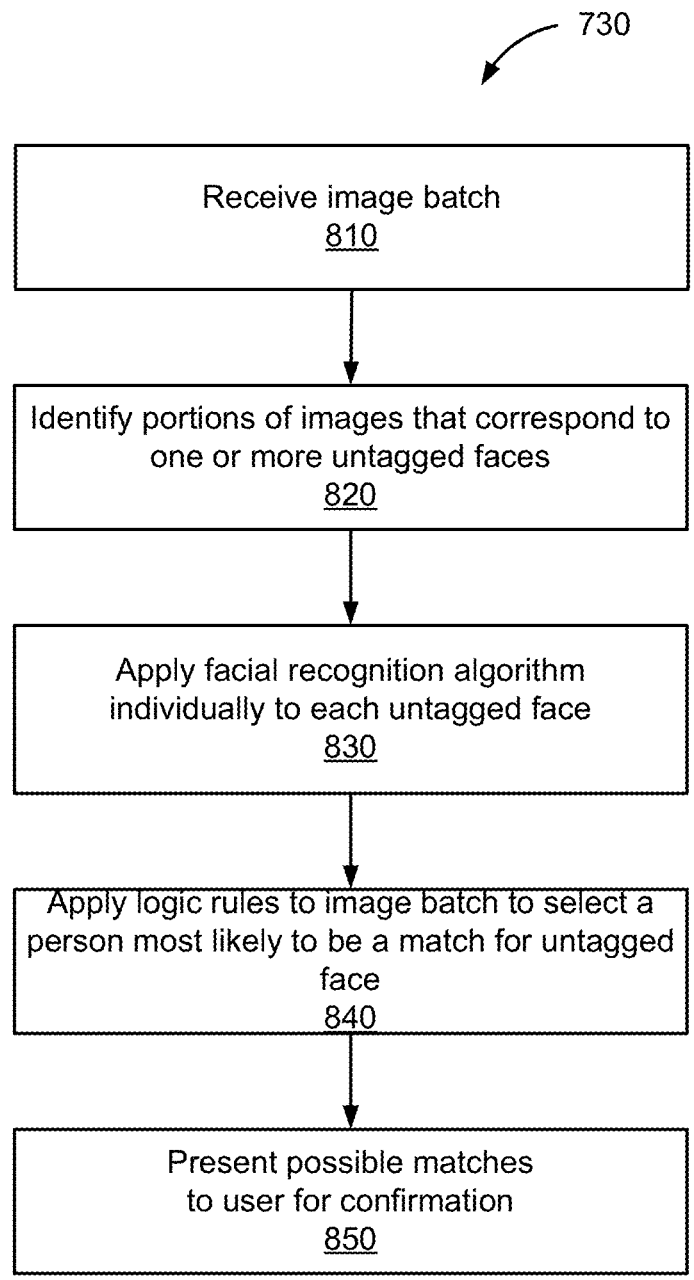
FIG. 8 is a flow chart illustrating a process for identifying people within an image using logic enhanced facial recognition, in accordance with one embodiment.

FIG. 8 is a flow chart illustrating a method 730 for identifying people within an image using logic enhanced facial recognition in step 730 of FIG. 7, in accordance with one embodiment. FIG. 8 attributes the steps of the method to the person recognition module 230. However, some or all of the steps may be performed by other entities. In addition, some embodiments may perform the steps in parallel, perform the steps in different orders or perform different steps.

Initially, the person recognition module 230 receives 810 a batch of images. The batch may be the entire batch of images received 710 by the image server 110 or a subset thereof. For example, the images can be sent to the person recognition module in groups of five, or even individually.

The face detection module 410 identifies 820 one or more portions of the images in the received batch that correspond to faces that have not yet been matched to people, referred to herein as "untagged" faces. The process by which portions of images are identified 820 as corresponding to untagged faces is described above with reference to FIG. 4.

The facial recognition module 420 applies 830 a facial recognition algorithm to each of the untagged faces individually. As described above with reference to FIG. 4, the facial recognition module 420 may apply the algorithm directly or may send the untagged faces to a third party facial recognition service via the network 120.

Once the facial recognition algorithm has been applied, the logic engine 430 applies 840 logic rules to select a person most likely to be a match for each untagged face. Alternatively, the logic engine 430 tags the face as corresponding to an unknown person. The operation of the logic engine 430 is also described above with reference to FIG. 4.

The confirmation module 440 presents 850 the matches selected by the logic engine 430 to the user at the client device 130 (via network 120) for the user to confirm or reject. Face matches that are verified are added to the recognized people 316 image metadata 304 as well as the facial recognition model for the matched person in the facial recognition model database 460. In one embodiment, face matches that are rejected are added to a negative model that is used to reduce the likelihood of similar incorrect matches in future. Negative models become particularly powerful when the correct match for a previously incorrectly matched face is found. In such cases, the person recognition module 230 can "learn" that two people are commonly confused by the facial recognition algorithm. Machine learning techniques can then be utilized to improve the person recognition module's success rate in correctly distinguishing between the two people.

Physical Components of a Computer

Figure 10:
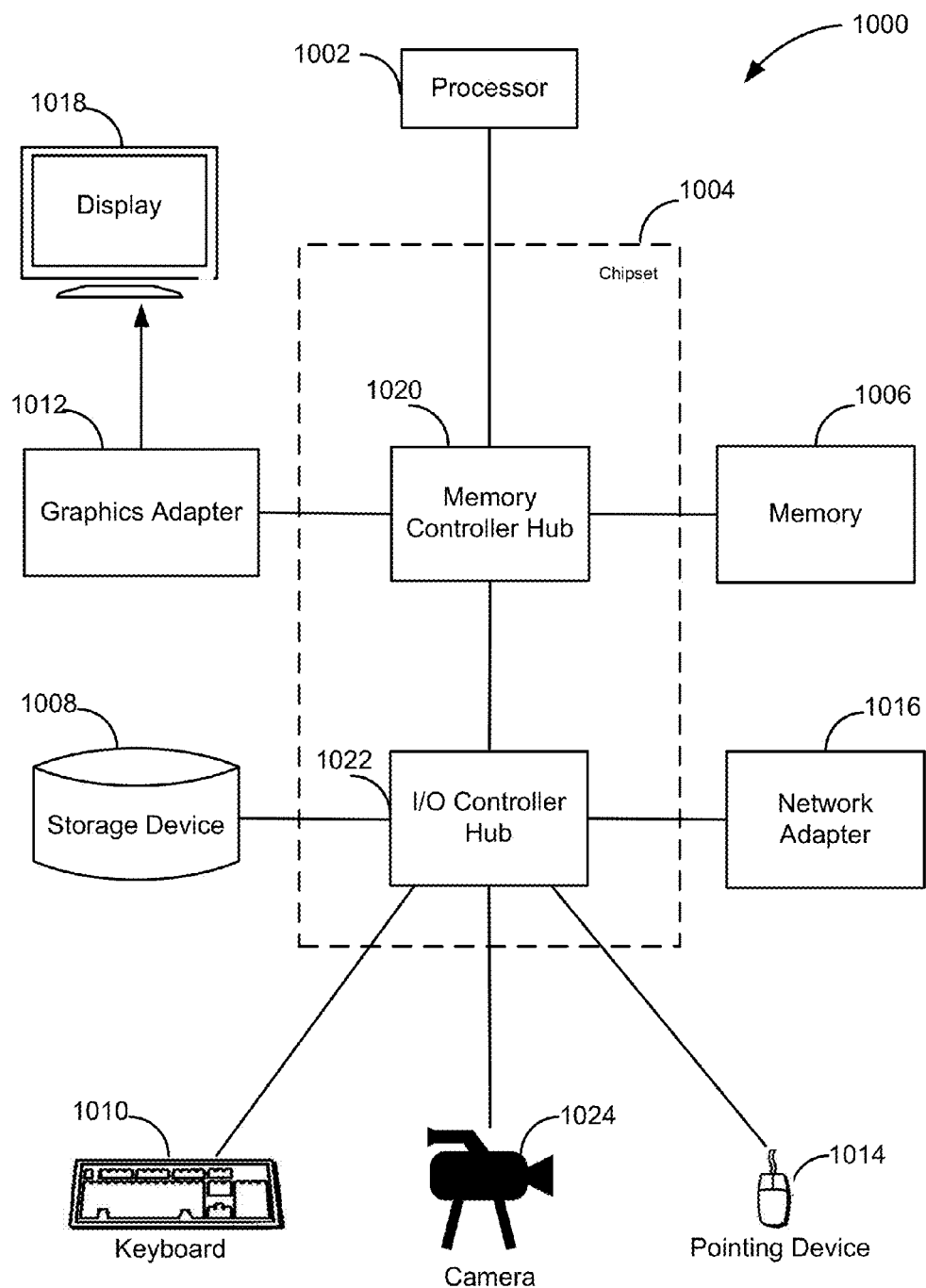
FIG. 10 is a block diagram of the components of a computing system for use, for example, as the server or client devices depicted in FIG. 1, in accordance with one embodiment.

FIG. 10 is a block diagram of the components of a computing system 1000 for use, for example, as the image server 110 or client devices 130 depicted in FIG. 1, in accordance with one embodiment. Illustrated are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O controller hub 1022. In another embodiment, the memory 1006 is coupled directly to the processor 1002 instead of the chipset 1004.

The storage device 1008 is any non-transitory computer-readable storage medium, such as a hard drive, compact disk read-only memory (CD-ROM), DVD, or a solid-state memory device. The memory 1006 holds instructions and data used by the processor 1002. The pointing device 1014 may be a mouse, track ball, or other type of pointing device, and is used in combination with the keyboard 1010 to input data into the computer 1000. The graphics adapter 1012 displays images and other information on the display 1018. The network adapter 1016 couples the computer 1000 to a network.

As is known in the art, a computer 1000 can have different and/or other components than those shown in FIG. 10. For example, in some embodiments, such as where the computer 1000 is a smartphone, the computer includes a built-in camera 1024 for capturing images. Images captured by the camera 1024 are stored in the storage device 1008 by the I/O controller hub 1022. In addition, the computer 1000 can lack certain illustrated components. In one embodiment, a computer 1000 acting as a server may lack a keyboard 1010, pointing device 1014, graphics adapter 1012, and/or display 1018. Moreover, the storage device 1008 can be local and/or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 808, loaded into the memory 1006, and executed by the processor 1002.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Additional Configuration Considerations

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for performing assisted tagging of people, locations, and activities in images. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer system for tagging images, comprising:
   one or more computer processors configured to receive a batch of images comprising images of faces,
   to identify a portion of an image in the batch that corresponds to an untagged face,
   to apply a facial recognition algorithm to the portion of the image, wherein the facial recognition algorithm takes input from a plurality of facial recognition models, wherein the plurality of facial recognition models each is associated with a known person,
   to receive from the facial recognition algorithm, matching data comprising possible tags for the untagged face, wherein each of the possible tags for the untagged face is associated with one of the known persons and a probability factor,
   to determine a likelihood for one of the possible tags to correctly match the untagged face based on logic rules, and
   to automatically select a provisional tag for the untagged face from the possible tags based on the likelihood,
   wherein the one or more computer processors are configured to identify a highest probability factor among probability factors associated with known persons for multiple untagged faces;
   to assign a first untagged face to a first known person based on the highest probability factor; and
   to eliminate at least one of the possible tags from a second untagged face based on the highest probability factor.

2. The computer system of claim 1, wherein the one or more computer processors are configured to determine a location at which the image was taken, wherein the logic rules specify that the untagged face in the image cannot be tagged to a person that is known to be at a different location when the image was taken.

3. The computer system of claim 1, wherein the one or more computer processors are configured to determine an age of the untagged face in the image, wherein the logic rules specify that the untagged face cannot be tagged to a person that has a different age from the age determined for the untagged face.

4. The computer system of claim 1, wherein the logic rules specify that the untagged face in the image cannot be tagged to a person that is already tagged to another face in the image.

5. The computer system of claim 1, wherein the one or more computer processors are configured to send a facial recognition request, the request including the portion of the image to a facial recognition sever and to receive the matching data from the facial recognition server.

6. The computer system of claim 1, wherein the one or more computer processors are configured to determine a gender of the untagged face in the image, wherein the logic rules specify that the untagged face cannot be tagged to a person that has a different gender from the gender determined for the untagged face.

7. The computer system of claim 1, wherein the matching data further comprises at least one of: an estimated age for the face and a predicted gender for the face.

8. The computer system of claim 1, wherein the matching data further comprises an unknown person tag indicating that no match was found.

9. The computer system of claim 8, wherein the one or more computer processors are configured to determine importance of people tagged as unknown based on a frequency that faces of the people appear in a user's images.

10. The computer system of claim 9, wherein the one or more computer processors are configured to present unknown people for identification by a user in order of importance.

11. The computer system of claim 1, wherein the one or more computer processors are configured
   to send, to a client device, a plurality of provisional tags and the corresponding untagged faces, for display at the client device;
   to receive an indication that one or more of the provisional tags are incorrect from the client device;
   to replace the one or more provisional tags that are indicated to be incorrect with a provisional unknown person tag; and
   to verify tags not indicated to be incorrect.

12. The computer system of claim 11, wherein the one or more computer processors are configured to group a subset of faces with an unknown person tag into a group based on a similarity between matching data corresponding to each of the subset; and to sending, to the client device, a request for a user provide an identity for the group and indicate any faces in the group that do not correspond to the provided identity.

13. The computer system of claim 11, wherein the one or more computer processors are configured to receive an input from the user that indicates at least one of the untagged faces that has been incorrectly tagged.

14. The computer system of claim 11, wherein the one or more computer processors are configured to update at least one of facial recognition models based on the tags that are not indicated to be incorrect.

15. The computer system of claim 11, wherein the one or more computer processors are configured to update at least one of facial recognition models based on the provisional tags indicated to be incorrect.

16. A computer system for tagging images, comprising:
one or more computer processors configured to receive a batch of images,
to compare location metadata for each of the images to a database of known locations, each known location comprising a name and a geographic area,
to tag images with location metadata indicating a location within the geographic area of a known location as corresponding to that known location,
to create a group comprising a plurality of images that do not correspond to a known location, the plurality of images having corresponding location metadata indicating a location within a threshold distance of other images in the group, and
to send a request for a user to provide a name for the location and indicate any images in the group that do not correspond to the named location.

17. The computer system of claim 16, wherein the one or more computer processors configured to determine location metadata for at least one image based on an IP address of a device used to upload the at least one image.

18. A computer system for tagging images, comprising:
one or more computer processors configured to receive a batch of images,
to compare a timestamp metadata for each of the images to a database of known activities, each known activity comprising at least a name and a time range,
to tag images as corresponding to a known activity responsive to the images having timestamp metadata within the time range of the known activity,
to create a group comprising a plurality of images that do not correspond to a known activity, each image in the group having a timestamp within a threshold time of a timestamp of least one other image in the group, and
to send a request for a user to provide a name for an activity and indicate any images in the group that to not correspond to the activity.

19. The computer system of claim 18, wherein each image in the group has a location within a threshold distance of a location of another image in the group.

20. The computer system of claim 19, wherein the one or more computer processors configured to determine location metadata for at least one image in the group based on an IP address of a device used to upload the at least one image in the group.

* * * * *